United States Patent
Le-Ngoc et al.

(10) Patent No.: US 9,608,706 B2
(45) Date of Patent: Mar. 28, 2017

(54) SYSTEM AND METHOD FOR MULTIPLE-INPUT AND MULTIPLE-OUTPUT (MIMO) FULL-DUPLEX PRECODING STRUCTURES

(71) Applicant: Huawei Technologies Canada Co., Ltd., Kanata (CA)

(72) Inventors: Tho Le-Ngoc, Montreal (CA); Sean Huberman, Nepean (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days.

(21) Appl. No.: 15/207,250

(22) Filed: Jul. 11, 2016

(65) Prior Publication Data

US 2016/0323023 A1    Nov. 3, 2016

Related U.S. Application Data

(63) Continuation of application No. 14/634,256, filed on Feb. 27, 2015, now Pat. No. 9,391,680.

(Continued)

(51) Int. Cl.
*H04L 5/14*    (2006.01)
*H04L 1/02*    (2006.01)
(Continued)

(52) U.S. Cl.
CPC ......... *H04B 7/0456* (2013.01); *H04B 1/0475* (2013.01); *H04B 1/525* (2013.01);
(Continued)

(58) Field of Classification Search
CPC .. H04B 7/0413; H04B 1/525; H04B 74/0478; H04B 7/0452; H04B 1/10;
(Continued)

(56) References Cited

U.S. PATENT DOCUMENTS

9,014,069 B2    4/2015  Patil et al.
9,019,849 B2    4/2015  Hui et al.
(Continued)

FOREIGN PATENT DOCUMENTS

EP    2472727 A1    4/2012
WO    2013120087 A1    8/2013

OTHER PUBLICATIONS

Huberman, S., "MIMO Full-Duplex Precoding: A Joint Beamforming and Self-Interference Cancellation Structure," IEEE Transactions on Wireless Communications, Dec. 2014, 13 pages.

(Continued)

*Primary Examiner* — Tesfaldet Bocure
(74) *Attorney, Agent, or Firm* — Slater Matsil, LLP

(57) ABSTRACT

Embodiments are provided to enable effective cancellation or reduction of the self-interference (SI) introduced when applying full-duplex (FD) transmission to Multiple-Input-Multiple-Output (MIMO) systems. A method embodiment includes forming, using a precoding matrix generated in accordance with channel conditions, a plurality of beams for a plurality of transmit signals and a plurality of self-interference cancellation signals corresponding to the plurality of transmit signals. The method further includes transmitting, at a plurality of antennas, the plurality of beams for the transmit signals, and receiving, via the plurality of antennas, a plurality of receive signals. A corresponding self-interference cancellation signal is then added to each of the plurality of receive signals to obtain a plurality of corrected receive signals, and the plurality of corrected receive signals are detected at a plurality of receivers.

13 Claims, 3 Drawing Sheets

Related U.S. Application Data

(60) Provisional application No. 61/945,507, filed on Feb. 27, 2014.

(51) Int. Cl.
| | | |
|---|---|---|
| *H04B 15/00* | (2006.01) | |
| *H04B 7/0456* | (2017.01) | |
| *H04B 1/04* | (2006.01) | |
| *H04B 1/525* | (2015.01) | |
| *H04B 7/0417* | (2017.01) | |
| *H04B 7/06* | (2006.01) | |

(52) U.S. Cl.
CPC ......... *H04B 7/0417* (2013.01); *H04B 7/0617* (2013.01); *H04B 15/00* (2013.01); *H04L 5/14* (2013.01)

(58) Field of Classification Search
CPC .... H04B 7/0417; H04B 1/1027; H04B 15/00; H04B 1/56; H04B 7/0456; H04B 7/15585; H04B 7/0617; H04B 7/0689; H04B 3/32; H04B 7/0669; H04B 1/027; H04B 1/123; H04L 5/14; H04L 1/00; H04L 5/1461; H04L 25/003343; H04L 1/06; H04L 27/2647; H04L 25/03057; H04L 2025/03414; H01Q 21/00
USPC ............... 375/295, 219, 285, 346, 296, 316; 455/73, 78, 91, 130
See application file for complete search history.

(56) References Cited

U.S. PATENT DOCUMENTS

| | | |
|---|---|---|
| 2004/0252632 A1 | 12/2004 | Bourdoux et al. |
| 2008/0300004 A1 | 12/2008 | Balachandran et al. |
| 2011/0255576 A1 | 10/2011 | Chen et al. |
| 2013/0089009 A1 | 4/2013 | Li et al. |
| 2013/0114468 A1 | 5/2013 | Hui et al. |
| 2013/0301487 A1 | 11/2013 | Khandani |

OTHER PUBLICATIONS

Masmoudi, A., et al., Self-Iinterference Channel Estimation and Cancellation for Full-Duplex Communications Systems,: Dept. of Electrical and Computer Engineering, McGill University, May 2014, 11 pages.

SYSTEM AND METHOD FOR MULTIPLE-INPUT AND MULTIPLE-OUTPUT (MIMO) FULL-DUPLEX PRECODING STRUCTURES

CROSS-REFERENCE TO RELATED APPLICATIONS

This application is a continuation of U.S. patent application Ser. No. 14/634,256, filed on Feb. 27, 2015, now issued as U.S. Pat. No. 9,391,680 on Jul. 12, 2016, which claims the benefit of U.S. Provisional Application No. 61/945,507 filed on Feb. 27, 2014, both of which are hereby incorporated herein by reference.

TECHNICAL FIELD

The present invention relates to wireless communications and networking, and, in particular embodiments, to a system and method for Multiple-Input and Multiple-Output (MIMO) Full-Duplex precoding.

BACKGROUND

Half Duplex (HD) transmission systems transmit and receive signals in alternate time windows. An HD transceiver will either transmit or receive a signal in a particular frequency band over single defined time window Full-Duplex (FD) transmission systems can both transmit and receive signals in a given frequency band at the same time. FD systems have the potential to provide approximately double sum-rate improvements over HD systems. However, FD systems often suffer from high self-interference. Self-interference refers to the error added to the detected received signal that can be attributed to reflection and/or leakage of the transmitted signal into the receiver path in the system. Multiple-Input-Multiple-Output (MIMO) transmission systems, where multiple antennas are used at both the transmitter and receiver to improve communication performance, have also been developed. MIMO systems and techniques can provide increases in data throughput and link range without additional bandwidth or increased transmit power in comparison to a single antenna system. These improvements over single input single output systems can be achieved by spreading the same total transmit power over multiple antennas to achieve at least one of an array gain that improves the spectral efficiency (more bits per second per hertz of bandwidth) and/or a diversity gain that improves the link reliability. There is a need for effective self-interference mitigation to realize the benefits of FD operation in MIMO systems.

SUMMARY

In accordance with an embodiment, a method performed by a network component for full-duplex communications in a Multiple-Input and Multiple-Output (MIMO) system includes forming, using a precoding matrix generated in accordance with channel conditions, a plurality of beams for a plurality of transmit signals and a plurality of self-interference cancellation signals corresponding to the plurality of transmit signals. The method further includes transmitting, at a plurality of antennas, the plurality of beams for the transmit signals, and receiving, via the plurality of antennas, a plurality of receive signals. A corresponding self-interference cancellation signal is then added to each of the plurality of receive signals to obtain a plurality of corrected receive signals, and the plurality of corrected receive signals are detected at a plurality of receivers.

In accordance with another embodiment, a method performed by a network component for full-duplex communications in a MIMO system includes forming, using a first precoding matrix generated in accordance with signal channel conditions, a plurality of beams corresponding to a plurality of transmit signals, and further forming, using a second precoding matrix generated in accordance with signal channel conditions, a plurality of self-interference cancellation signals corresponding to the plurality of transmit signals. The method further includes transmitting, at a plurality of antennas, the plurality of beams for the transmit signals, and receiving, via the plurality of antennas, a plurality of receive signals. A corresponding self-interference cancellation signal is then added to each of the plurality of receive signals to obtain a plurality of corrected receive signals, and the plurality of corrected receive signals are detected at a plurality of receivers.

In accordance with yet another embodiment, a network component for full-duplex communications in a MIMO comprises a processor and a non-transitory computer readable storage medium storing programming for execution by the processor. The programming includes instructions to form, using a precoding matrix generated in accordance with channel conditions, a plurality of beams for a plurality of transmit signals and a plurality of self-interference cancellation signals corresponding to the plurality of transmit signals. The network component further comprises a plurality of antennas configured to transmit the plurality of beams for the plurality of transmit signals and to receive a plurality of receive signals, and a plurality of combiners or couplers configured to add, to each of the plurality of receive signals, a corresponding self-interference cancellation signal to obtain a plurality of corrected receive signals. The network component also includes a plurality of receivers configured to detect the plurality of corrected receive signals.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In MIMO systems, algorithms are used to calculate a precoding channel matrix that determines the transmission of multiple channels to multiple users while avoiding (or substantially reducing) signal interferences between the different receiving user equipments (UEs) or mobile stations (MSs). Conventional MIMO systems use HD transmissions. Applying FD transmission to MIMO systems can provide approximately double sum-rate improvements over standard HD MIMO systems. However, conventional FD transmission schemes typically suffer from high self-interference (SI). Embodiments are provided herein to enable effective cancellation (or reduction) of the SI introduced when applying FD transmission to the MIMO system. The embodiments include using a FD precoding structure and an effective full-duplex cancellation scheme that can be implemented in MIMO systems. A MIMO FD Precoding (FDP) structure is used to address both beam-forming for the forward or transmit channel and self-interference suppression. The methods discussed herein are applicable to a plurality of modulation formats including Orthogonal Frequency-Division Multiplexing (OFDM). Those skilled in the art will appreciate that for the sake of ease of presentation, the following discussion will focus on the application of the methods to OFDM transmissions. The precoding structure allows for various precoding algorithms and different optimization criteria/objectives to be developed for both point-to-point and point-to-multipoint MIMO FD systems. Specifically, the structure includes a combination of a beam-former and a self-interference canceller. Such structure provides additional transmit degrees of freedom.

Figure 1:
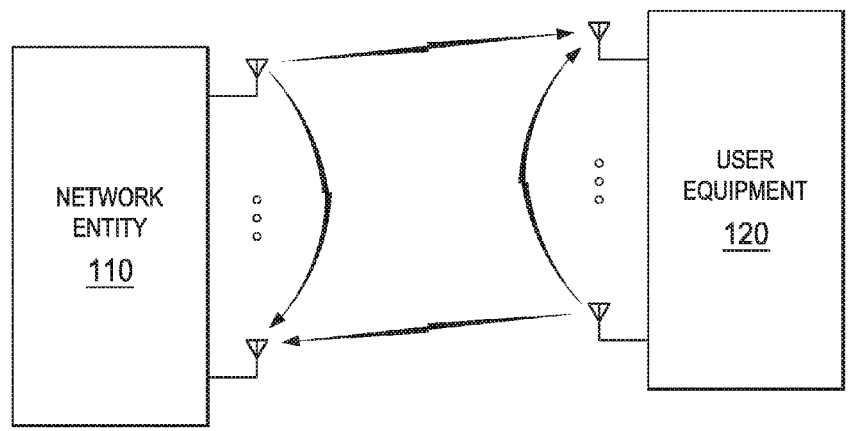
FIG. 1 illustrates a full-duplex MIMO point-to-point network.
Figure 2:
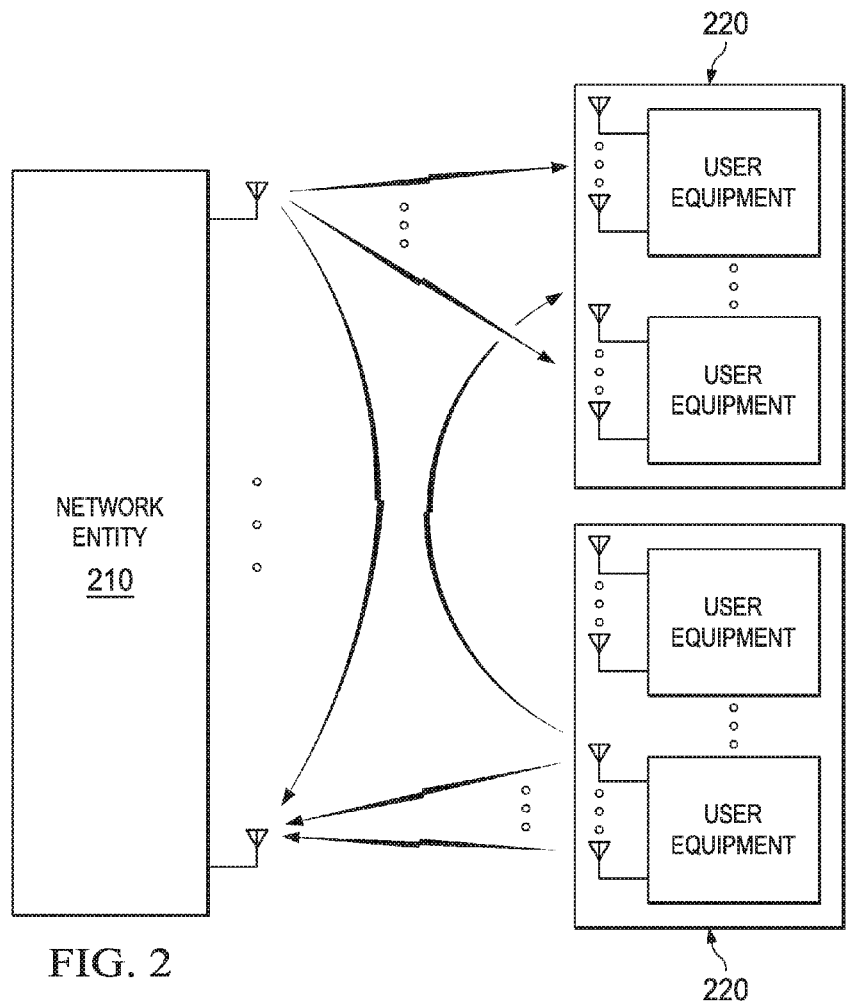
FIG. 2 illustrates a full-duplex MIMO point-to-multipoint network with half-duplex user equipment.
Figure 3:
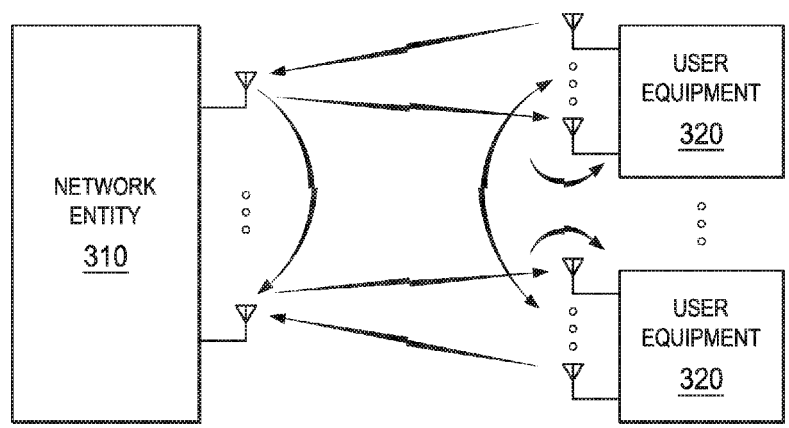
FIG. 3 illustrates a full-duplex MIMO point-to-multipoint network with full-duplex user equipment.

FIGS. 1, 2, and 3 show embodiments of FD MIMO networks, where the precoding structure can be used. FIG. 1 illustrates a FD MIMO point-to-point network. The FD single-user MIMO network includes a network entity 110, e.g., a base station, that serves a user equipment (UE) 120, e.g., a smartphone, a laptop, or any other suitable user operated device. Both the network entity 110 and the UE 120 can communicate using FD transmission (can transmit and receive at the same time) with multiple antennas according to the MIMO scheme and the FDP structure described further below. As can be seen from the figures, when transmitting in FD mode, the transmitted signal can be received by the receive antenna of the same device. This is a manifestation of the self-interference phenomenon that will be addressed below. FIG. 2 illustrates a FD multi-user MIMO network with HD UE. This network includes a network entity 210 (e.g., a base station) that serves multiple UEs 220. In this scenario, the network entity 210 can communicate with each UE 220 using FD transmission, while each UE 220 communicates with the network entity 210 using HD transmission (e.g., the UE can either transmit or receive at any particular moment, while the network entity can transmit and receive simultaneously). Each one of the network entity 210 and UEs 220 use multiple antennas according to the MIMO scheme. FIG. 3 illustrates a FD MIMO point-to-multipoint network with FD UEs. In this scenario, the network entity 310 and the UEs 320 can communicate using FD transmission with multiple antennas.

Figure 4:
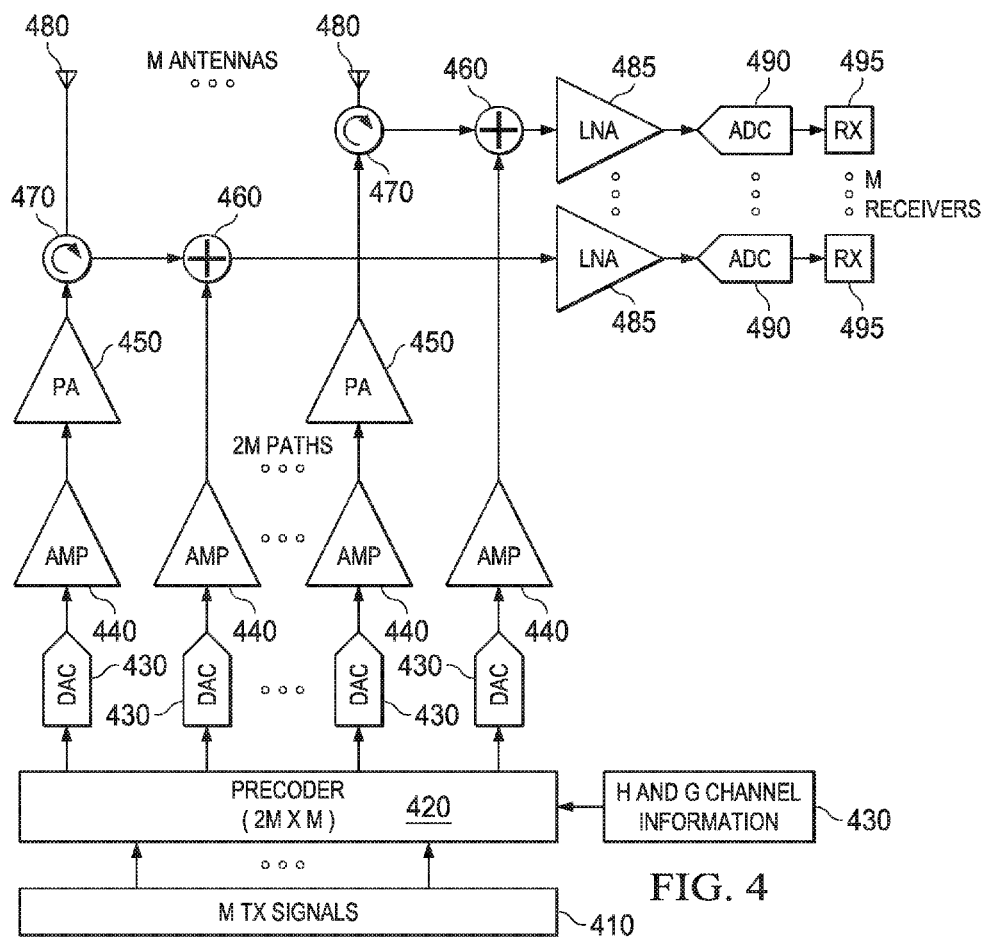
FIG. 4 illustrates an embodiment of a MIMO full-duplex precoding structure.

FIG. 4 illustrates an embodiment of a MIMO FD precoding structure. The precoding structure can be part of a FD transmitter/receiver (transceiver) 400 with M transmit/receive antennas, where M is an integer. For example, the transceiver can correspond to any of the network entities 110, 210 or 310 or to the UEs 120 or 320 with FD communications capability in the scenarios above. The M transmit (Tx) signals from transmitter 410 are preprocessed by a precoder 420 using a 2M×M precoding matrix. Using the precoding matrix, the precoder 420 acts as a joint beam-former for forward transmission and self-interference canceller, for instance with the objective of maximizing the sum-rate. The M Tx signals are split into 2M paths, as shown in FIG. 4. Each of the 2M paths includes a Digital-to-Analog Converter (DAC) 430 and an amplifier (Amp) 440.

The 2M paths include a subset of M paths from the precoder 420, referred to herein as M Tx paths, which is used for forward transmission. Each of the M Tx paths also include a Power Amplifier (PA) 450, and a circulator 470. A circulator is a passive device in which a signal enters one port and is transmitted to the next port by rotation. The circulator 470 allows for the transceiver 400 to transmit and receive simultaneously while providing some passive isolation between the M Tx paths from the precoder 420 and the M receive paths to the M receivers (Rx) 495. However, the transceiver 400 can require significantly more cancellation than the circulator 470 provides in order to have reliable signal detection. In another embodiment, an isolator can be used instead of the circulator 470. The isolator is another passive device that allows for the transceiver 400 to transmit and receive simultaneously while providing isolation between the M Tx paths from the precoder 420 and the M receive paths to the M receivers (Rx) 495.

The 2M paths also include a second subset of M paths to the combiners 460, referred to herein as M SI cancellation paths, form an equivalent to an active canceller to cancel the self-interference. However, the objective of the precoding is not necessarily to focus on minimizing the self-interference. The M SI cancellation paths are connected to their respective M receive paths via combiners 460. The combiners are any suitable devices capable of combining signals together, and are also referred to herein as couplers. Each combiner or coupler 460 is positioned between a circulator 470 on the corresponding antenna 480 side and a low noise amplifier (LNA) 485 and an analog to digital converter (ADC) 490 on the corresponding receiver 495 side. In each of the M receive paths, the combiner 460 adds an SI signal carried by an SI cancellation path. This effectively mitigates SI in the receivers 495. The SI cancellation signals are calculated using the 2M×M precoder 420 with the M Tx paths as part of a joint beam-forming and SI cancellation precoding. The precoding is established using channel information 430 (e.g., H and G channel matrices). The channel information 430 can be obtained via channel measurements, e.g., during a preliminary HD transmission phase.

The precoding structure of the transceiver 400, as shown in FIG. 4, makes use of MIMO precoding to jointly beamform the forward transmission and cancel the self-interference. As such, the cancellation is done by matrix precoding. Additionally, this structure allows for different optimization objectives (rather than solely minimizing self-interference). For instance, the transmit signals can be preprocessed using matrix precoding (using the 2M×M precoding matrix at the precoder 420) to maximize the sum-rate and achieve a trade-off between the forward channel beam-forming and the self-interference suppression. Hence, the precoding structure provides a more generalized framework for the optimization of both single-user and multi-user full-duplex transceivers.

In another embodiment, two separate precoding matrices can be used for the M Tx paths (forward or transmit channels) and the M SI cancellation paths (self-interference channels). In this case, one M×M precoder is applied to the forward channel and another M×M precoder is applied to the self-interference channels. This approach to separate the 2M×M precoding matrix into two M×M precoder matrices corresponds to a matrix-version of an active cancellation approach, where the cancellations are computed via precoding.

Other embodiments include transceivers with dedicated transmit and receive antennas. Such embodiments would not require the use of circulators but would require additional antenna arrangements. In another embodiment, the transceivers have different numbers of transmit and receive antennas. In yet another embodiment, the precoding scheme above is combined with existing passive cancellation techniques. In various embodiments, various methods can be used for obtaining channel information, including off-line and online measurements and/or estimation techniques.

Other embodiments include joint precoding matrices of different dimensions than 2M×M. For example, the M transmit signals could be expanded to 2M transmit signals by padding the original M transmit signals with M zeros, leading to a 2M×2M square precoding matrix which may have some advantages from a mathematical optimization or computation perspective.

One feature of the disclosure is providing a generalized framework for optimization of both single-user and multi-user FD transceivers. The disclosure also allows for different optimization objectives other than minimizing self-interference (e.g., maximizing sum-rate), and allows for joint beamformer and self-interference canceller. Another advantage is simplifying implementation for MIMO structures.

In an embodiment, the precoding structure of FIG. 4 above can be applied at the base station to operate in FD mode and increase the capacity (bits/second/Hertz/area). This is also applicable for small-cell deployments supporting an LTE or next generation networks such as a 5th generation (5 G) network, for example. The structure can also be applied at a wireless device (e.g., WiFi) or other non-RAN technology and benefits both the user and the service provider by providing significant capacity increases. FD systems are a strong candidate for increasing the capacity of wireless networks. The embodiments herein provide a practical structure for both point-to-point and point-to-multipoint FD systems. Further details of the precoding structure and the joint use of the beam-former and SI canceller are described by Sean Huberman and Tho Le-Ngoc in a technical paper draft entitled "MIMO Full-Duplex Precoding: A Joint Beamforming and Self-Interference Cancellation Structure".

Figure 5:
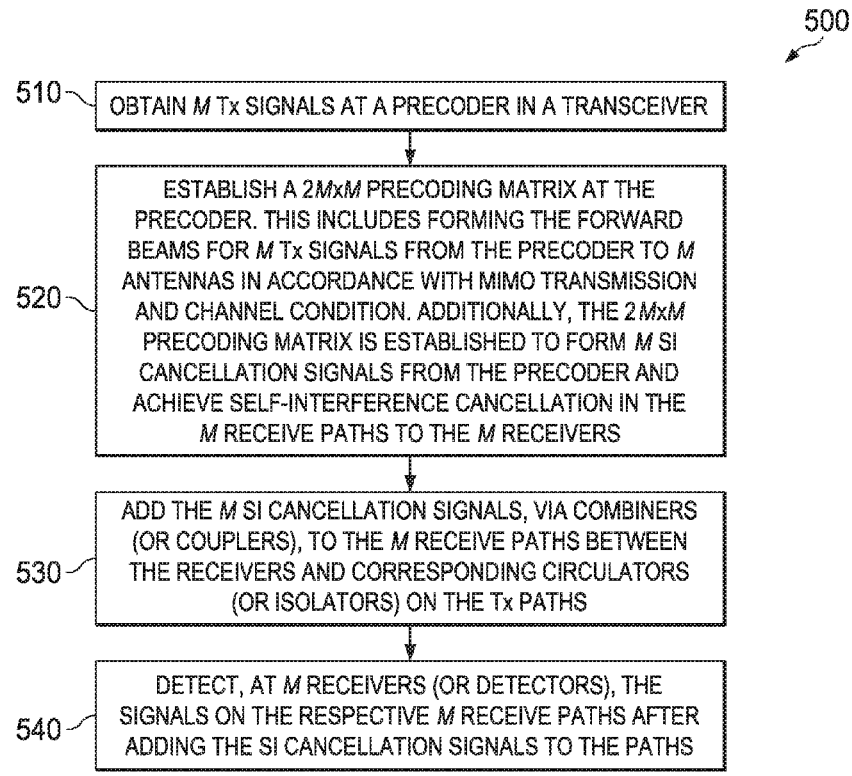
FIG. 5 illustrates an embodiment of a full-duplex operation method that can be used for MIMO systems.

FIG. 5 illustrates an embodiment of a full-duplex operation method that can be used for MIMO systems. The method can be implemented using the precoding structure above. At step 510, M Tx signals corresponding to M MIMO antennas are obtained at a precoder in a transceiver. At step 520, a 2M×M precoding matrix is established at the precoder. Specifically, the 2M×M precoding matrix is established according to channel information to form the forward or transmit beams for M Tx signals from the precoder to M antennas in accordance with MIMO transmission. Additionally, the 2M×M precoding matrix is established to form M SI cancellation signals from the precoder and achieve self-interference cancellation in the M receive paths to the M receivers. At step 530, the M SI cancellation signals are added, via combiners (or couplers), to the M receive paths between the receivers and corresponding circulators (or isolators) on the Tx paths. The combination of the M SI cancellation signals with the respective M received signals to the M receivers effectively cancels or substantially reduces the SI signal (or SI error) in the M received and hence detected signals by the receivers. At step 540, after adding the M SI cancellation signals to the M receive paths, the resulting signals are detected by the M receivers (or detectors).

Figure 6:
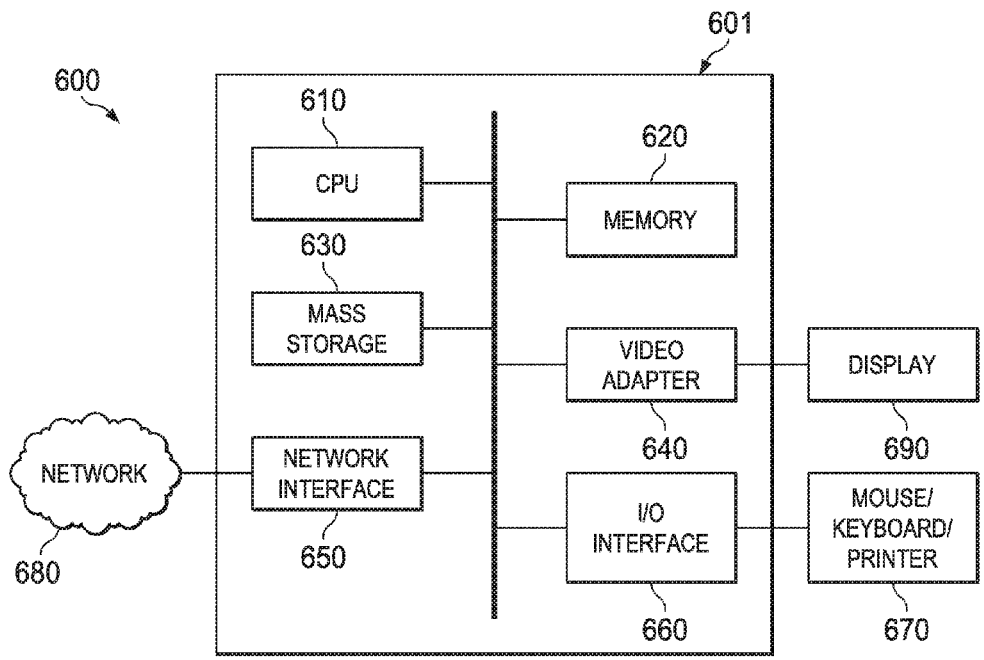
FIG. 6 is a diagram of a processing system that can be used to implement various embodiments.

FIG. 6 is a block diagram of a processing system 600 that can be used to implement various embodiments. For instance the processing system 600 can be part of a UE, such as a smart phone, tablet computer, a laptop, or a desktop computer. The system can also be part of a network entity or component that serves the UE, such as a base station or a WiFi access point. The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus may be one or more of any type of several bus architectures including a memory bus or memory controller, a peripheral bus, a video bus, or the like.

The CPU bio may comprise any type of electronic data processor. In an embodiment, the processor may serve as a precoder for generating the 2M×M precoding matrix, such as the precoder 420. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The presented examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A full duplex transmitter/receiver having a plurality of transmit/receive antennas, the transmitter/receiver comprising:
   a plurality of receivers operatively connected to the plurality of transmit/receive antennas for receiving a signal;
   a precoder for receiving a plurality of transmit signals for transmission over the plurality of transmit/receive antennas and for precoding the received plurality of transmit signal for transmission over the plurality of transmit/receive antennas; and
   a plurality of signal paths, a first portion of the plurality of signal paths operatively connecting the precoder to one of the plurality of transmit/receive antennas, and a second portion of the plurality of signal paths operatively connecting the plurality of transmit/receive antennas to the plurality of receivers, wherein at least one of the first portion of the plurality of signal paths is connected to at least one of the second portion of the plurality of signal paths by a Self Interference (SI) cancellation path for actively cancelling self-interference generated by the precoded plurality of transmit signals transmitted over the plurality of transmit/receive antennas.

2. The full duplex transmitter/receiver of claim 1, wherein the transmitter/receiver is a User Equipment (UE).

3. The full duplex transmitter/receiver of claim 1, wherein the transmitter/receiver is a base station.

4. The full duplex transmitter/receiver of claim 1, wherein the first portion of the plurality of transmit paths comprises a Digital-to Analog Converter (DAC) and an amplifier.

5. The full duplex transmitter/receiver of claim 1, wherein the SI cancellation path comprises an isolator.

6. The full duplex transmitter/receiver of claim 1, wherein the SI cancellation path comprises a circulator.

7. The full duplex transmitter/receiver of claim 6, wherein the SI cancellation path further comprises a combiner receiving as an input the one of the signals carried by a signal path in the first portion of signal paths and an output from the circulator, for actively cancelling the effect of one transmitted signal on a signal received by one of the plurality of transmit/receive antennas prior to arrival of the signal at the plurality of receivers.

8. The full duplex transmitter/receiver of claim 1, wherein the second portion of the of the plurality of signal paths comprise an amplifier and an analog-to-digital converter (ADC).

9. The full duplex transmitter/receiver of claim 8, wherein the amplifier is a low noise amplifier (LNA).

10. The full duplex transmitter/receiver of claim 1, wherein the SI cancellation path operates in an analog domain.

11. The full duplex transmitter/receiver of claim 1, wherein the precoder is a Multiple Input Multiple Output (MIMO) precoder for performing beam forming and forward transmission.

12. The full duplex transmitter/receiver of claim 11, wherein the MIMO precoder is configured to perform matrix precoding to cancel self-interference.

13. The full duplex transmitter/receiver of claim 11, wherein the MIMO precoder is configured to perform matrix precoding to maximize a sum-rate.

* * * * *